C. ZINGRE.
LAWN HORSESHOE.
APPLICATION FILED JAN. 5, 1921.
1,424,869.
Patented Aug. 8, 1922.
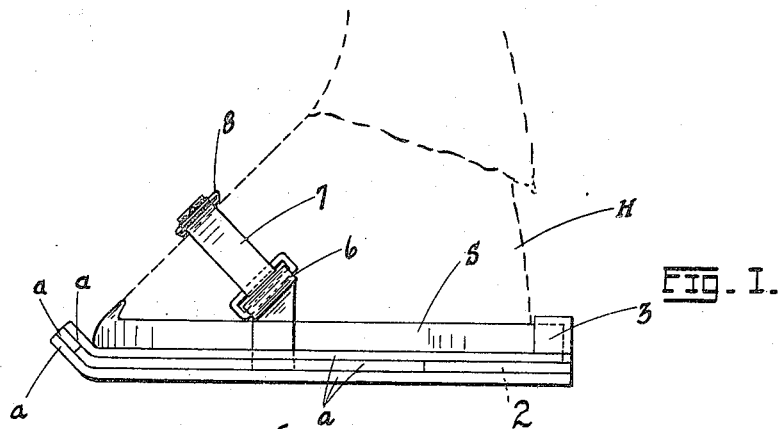
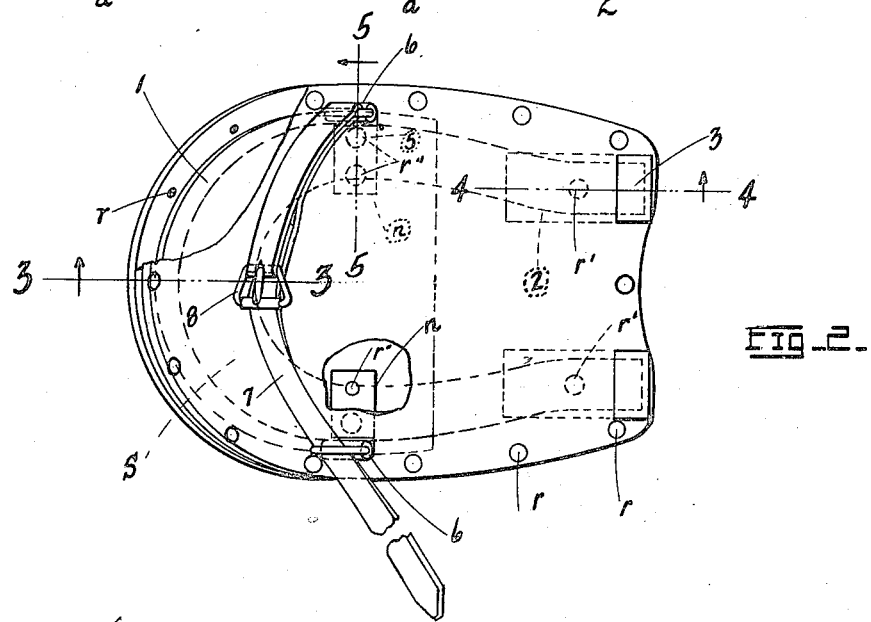
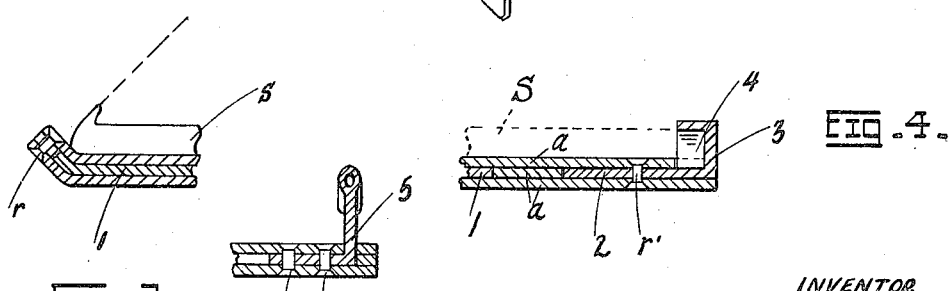
INVENTOR
Charles Zingre
BY F. R. Cornwall
ATTORNEY

UNITED STATES PATENT OFFICE.

CHARLES ZINGRE, OF WEBSTER GROVES, MISSOURI.

LAWN HORSESHOE.

1,424,869.  Specification of Letters Patent. Patented Aug. 8, 1922.

Application filed January 5, 1921. Serial No. 435,092.

*To all whom it may concern:*

Be it known that I, CHARLES ZINGRE, a citizen of the United States, residing at Webster Groves, St. Louis County, State of Missouri, have invented a certain new and useful Improvement in Lawn Horseshoes, of which the following is a full, clear, and exact description, such as will enable others skilled in the art to which it appertains to make and use the same, reference being had to the accompanying drawings, forming part of this specification.

My invention has relation to improvements in lawn horseshoes, and it consists in the novel details of construction more fully set forth in the specification and pointed out in the claims.

In the drawings,—

Figure 1 is a side elevation of a horseshoe showing my invention applied thereto, the hoof of the animal being shown dotted;

Fig. 2 is a top plan of the lawn-shoe with parts broken away, the horseshoe proper being shown dotted;

Fig. 3 is a sectional detail on the line 3—3 of Fig. 2;

Fig. 4 is a sectional detail on the line 4—4 of Fig. 2; and

Fig. 5 is a sectional detail on the line 5—5 of Fig. 2.

The present invention has for its object to provide a lawn-shoe for horses, mules, and other draft animals which may be readily attached to the hoof of the animal and to the ordinary horseshoe secured to said hoof, and as readily detached therefrom, the primary object sought being to construct a shoe which will be light, durable, and not clumsy. The main use for such a shoe, of course, is on lawns where horses are employed to draw a mower for cutting the grass, although obviously the application need not be restricted thereto.

The advantage of the shoe will be apparent from a detailed description of the invention, which is as follows:

Referring to the drawings, H represents the animal's hoof, and S the ordinary horseshoe, herein shown preferably without toe or heel calks. The lawn-shoe consists of a pad composed preferably of a series of layers $a$ of leather or equivalent material joined together by marginally disposed rivets $r$ or otherwise, and of a size to fairly overlap the hoof of the animal.

Interposed between the outer layers $a$ is a metallic plate 1, preferably of sheet metal, said plate acting as a stiffener for the pad. The plate 1 extends over about one-half the area of the pad, the rear part not requiring it as it is stiffened by the socket plates 2 having upstanding portions 3 wherein are formed sockets 4 to receive the rear parts of the shoe S. The socket plates are each fastened by a single rivet $r'$ passing through the layers of leather and the plates. The use of a single rivet permits of a swivel movement of the plates so that they may be capable of adjustment to shoes of varying widths.

The plate 1 is notched at opposite points at about the center of the pad, the notches $n$ permitting the insertion of anchor plates 5 terminating in loops 6. These anchor plates are also bounded by the layers $a$ of leather and are riveted thereto by rivets $r''$ so as to be absolutely held against movement. A strap 7 provided with a buckle 8 is secured to one of the loops 6 and is adapted to be passed through the opposite loop for fastening the pad to the animal's hoof. The construction of the strap is substantially the same as that of my former patent on a lawn-shoe, No. 1,050,901, dated January 21, 1913, of which this invention is an improvement.

It will be observed that the front edge of the pad is bent upwardly, the stiffening plate 1 being stiff enough to maintain this bend. The purpose of thus bending the front edge of the pad is to prevent the animal from digging into the soft turf with his toe. The object of notching the plate 1 to receive the anchor plates 5 is to avoid unnecessary bulk at these points.

It will be understood that I need not restrict myself to a pad made up of layers of leather but may resort to any material, even making the pad of steel plates entirely, which, if resorted to, would produce a pad of small bulk.

Having described my invention, I claim:

1. A lawn horseshoe comprising a metallic stiffening plate, layers of leather bounding the same, notches in said plate, and anchor plates positioned in said notches and extending beyond said layers of leather to form means for attaching the shoe to a hoof.

2. In a lawn horseshoe, a horizontal metallic stiffening plate extending substantially throughout the front half of the shoe, horizontal metallic socket plates located behind said plate and adapted to engage the heels of an ordinary shoe, horizontal anchor plates extending outwardly from said plate and provided with upstanding ears for hoof-attaching straps, the upper and lower horizontal surfaces of all of said plates lying in a common plane and said plates being secured together by one or more superimposed layers of leather.

3. A lawn-shoe comprising a pad composed of a metallic stiffening plate bounded by layers of covering material, said pad being bent upwardly at its forward end, anchor plates disposed in notches in the stiffening plate and secured to the covering material, socket plates swiveled to the covering material, and a strap adapted to be secured to the anchor plates, the strap and socket plates cooperating to secure the pad to the animal's hoof.

In testimony whereof I hereunto affix my signature this 31st day of December, 1920.

CHARLES ZINGRE.